United States Patent
Musik et al.

(10) Patent No.: US 11,146,562 B2
(45) Date of Patent: Oct. 12, 2021

(54) SYSTEM AND METHOD FOR MODIFYING PERMISSIONS ASSOCIATED WITH NETWORK-BASED RESOURCES VIA FINGERPRINT ENTRY ON COMMUNICATION DEVICES

(71) Applicant: MOTOROLA SOLUTIONS, INC., Chicago, IL (US)

(72) Inventors: Marta Tatiana Musik, Cracow (PL); Grzegorz Kaplita, Rzeszow (PL); Wojciech Jan Kucharski, Rzeszow (PL); Pawel Tomasik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 208 days.

(21) Appl. No.: 15/777,865

(22) PCT Filed: Dec. 23, 2015

(86) PCT No.: PCT/PL2015/050075
§ 371 (c)(1),
(2) Date: May 21, 2018

(87) PCT Pub. No.: WO2017/111635
PCT Pub. Date: Jun. 29, 2017

(65) Prior Publication Data
US 2018/0375874 A1     Dec. 27, 2018

(51) Int. Cl.
*H04L 29/06*     (2006.01)
*H04W 12/08*     (2021.01)
(Continued)

(52) U.S. Cl.
CPC ............ *H04L 63/102* (2013.01); *H04L 12/06* (2013.01); *H04L 63/0861* (2013.01); *H04W 12/06* (2013.01); *H04W 12/08* (2013.01)

(58) Field of Classification Search
CPC ................ H04L 63/102; H04L 12/06
(Continued)

(56) References Cited

U.S. PATENT DOCUMENTS

| 7,111,174 B2 | 9/2006 | Hamid |
| 7,508,840 B2 * | 3/2009 | Delaney ............... H04W 4/90 370/466 |

(Continued)

FOREIGN PATENT DOCUMENTS

| JP | 2007109129 | 4/2007 |
| WO | 2009/099735 | 8/2009 |
| WO | 2013/022431 | 2/2013 |

OTHER PUBLICATIONS

PCT/PL2015/050075 International Search Report and Written Opinion of the International Searching Authority dated Sep. 2, 2016 (9 pages).

(Continued)

*Primary Examiner* — Anthony D Brown
(74) *Attorney, Agent, or Firm* — Michael Best & Friedrich LLP

(57) ABSTRACT

A method and apparatus for adjusting permission settings associated with one or more network-based resources on a communication device. A graphical user interface is associated with a first user profile and is displayed on the communication device. A fingerprint entry is received on the communication device. The fingerprint entry is identified as associated with a second user profile that is authorized to change permission settings for the one or more network-based resources. The permission settings of the communication device are changed for the one or more network-based resources after identifying the fingerprint entry as associated with the second user profile.

19 Claims, 7 Drawing Sheets

(51) Int. Cl.
*H04L 12/06* (2006.01)
*H04W 12/06* (2021.01)

(58) Field of Classification Search
USPC .............................................................. 726/4
See application file for complete search history.

(56) References Cited

U.S. PATENT DOCUMENTS

| | | | |
|---|---|---|---|
| 8,892,899 | B1 | 11/2014 | Robinson et al. |
| 9,160,743 | B2* | 10/2015 | Anantharaman ... H04L 63/0861 |
| 2004/0054899 | A1* | 3/2004 | Balfanz ................... H04L 67/12 |
| | | | 713/168 |
| 2006/0284853 | A1 | 12/2006 | Shapiro |
| 2013/0201155 | A1 | 8/2013 | Wu et al. |
| 2014/0187189 | A1 | 7/2014 | Reitsma et al. |
| 2015/0036065 | A1 | 2/2015 | Yousefpor et al. |
| 2016/0330197 | A1* | 11/2016 | Barillaud ............ H04L 63/0861 |

OTHER PUBLICATIONS

Sugiura et al., "A User Interface Using Fingerprint Recognition—Holding Commands and Data Objects on Fingers," paper, pp. 71-79 (1998) C&C Media Research Laboratories, NEC Corporation, Japan, http://icie.cs.byu.edu/cs656/Papers/Fingerprint-sugiura-UIST98.pdf.

Holz et al., "Fiberio: A Touchscreen that Senses Fingerprints," paper, 10 pages (2013) Hasso Plattner Institute, Potsdam, Germany, http://www.christianholz.net/2013-uist13-holz-baudisch-Fiberio-A_Touchscreen_that_Senses_Fingerprints.pdf.

* cited by examiner

MOBILE COMMUNICATION DEVICE

SYSTEM AND METHOD FOR MODIFYING PERMISSIONS ASSOCIATED WITH NETWORK-BASED RESOURCES VIA FINGERPRINT ENTRY ON COMMUNICATION DEVICES

BACKGROUND OF THE INVENTION

Mobile communication devices may access network-based resources through wireless communication systems. For example, mobile communication devices may be configured to communicatively couple to a cellular network, a land mobile radio network, a wireless local area network (Wi-Fi), short range wireless (Bluetooth), and the like. In some cases, private networks provide remote access to files and programs that reside in the network infrastructure. Some networks have multi-layered access for multiple types of users that are each associated with a mobile communication device. These networks may be configured to allow the mobile communication device access to network-based resources based on security clearance or job function of the user associated with the mobile communication device. However, some methods of providing access to network-based resources may include manually entering and verifying credentials into the mobile communication device, which may be time consuming for the user. In addition, access levels to network-based resources may need to be modified temporarily based on current situations. For example, when arriving at a scene of an emergency, an emergency responder may need access to network-based resources that are not available to that particular emergency responder.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
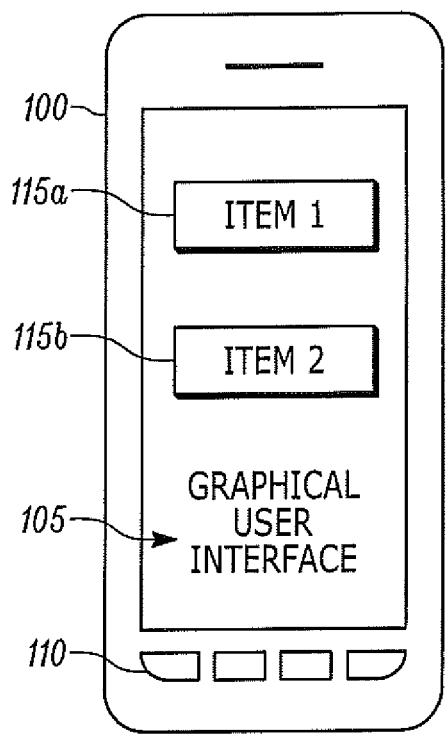
FIG. 1 is a front view of a mobile communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the invention provide a method of modifying permission settings that control access to one or more network-based resources on a communication device. The method includes operating the communication device using permission settings associated with a first user profile. A fingerprint entry is received on the communication device. The fingerprint entry is identified as associated with a second user profile. The second user profile includes authorization to modify the permission settings for the one or more network-based resources. The permission settings are modified for the one or more network based resources after identifying the fingerprint entry as associated with the second user profile.

Another embodiment of the invention provides a communication system for providing access to one or more network-based resources based on permission settings. The communication system includes a first communication device configured to display a graphical user interface associated with a first user profile. A fingerprint entry is received on the first communication device. The fingerprint entry is identified as associated with a second user profile. The second user profile includes authorization to modify the permission settings for the one or more network based resources. The permission settings of the first communication device for the one or more network-based resources are modified after identifying the fingerprint entry as associated with the second user profile.

Yet another embodiment of the invention provides a communication system including a wireless communication network that provides access to one or more network-based resources based on permission settings. The communication system includes a first communication device including a touchscreen. The first communication device is associated with a first user profile. A second communication device includes a touchscreen and is associated with a second user profile. The wireless communication network is communicatively coupled to the first communication device and the second communication device. The wireless communication network is configured to receive a fingerprint entry via the touchscreen of the first communication device and identify the fingerprint entry as associated with the second user profile. The second user profile includes authorization to modify the permission settings for the one or more network based resources. The wireless communication network is further configured to modify the permission settings for the one or more network based resources after identifying the fingerprint entry as associated with the second user profile.

FIG. 1 illustrates a mobile communication device 100 according to some embodiments. In various embodiments, the mobile communication device 100, may include various types and styles of mobile communication devices including mobile telephones, smart telephones, smart watches, tablet computers, land mobile radios, and the like. The mobile communication device 100 may operate over various communication channels and networks. For example, the mobile communication device 100 may be configured to communicatively couple to a cellular network, a land mobile radio network, a wireless local area network (Wi-Fi), short range wireless (Bluetooth), and the like.

The mobile communication device 100 includes a graphical user interface 105 (e.g., a touchscreen) and input buttons or other types of mechanical input controls. The graphical user interface 105 is touch sensitive. In other words, the mobile communication device 100 receives finger touch inputs (e.g., from a user of the mobile communication device) on the graphical user interface 105 and processes the finger touch inputs according to internal programming of the mobile communication device 100. In addition, the graphical user interface 105 is configured to detect a fingerprint entry from the finger touch and process the fingerprint entry as a user input. The graphical user interface 105 may include various types of devices that sense finger touch inputs, such as, for example, touchpads or other sensing devices that sense resistance or capacitances changes due to finger touch inputs. These sensing devices may be configured to detect presence, location, and movement of a finger touch input. In addition, these sensing devices may be configured to sense characteristics of a fingerprint (e.g., fingerprint shape and structure) and to send a signal based on the sensed characteristics. The mobile communication device 100 and the graphical user interface 105 may have more or less components and may be configured differently than the examples presented.

The graphical user interface 105 is also configured to display one or more items 115. In the illustrative example, the one or more items 115 include a first item (ITEM 1) 115a and a second item (ITEM 2) 115b, which are discussed collectively and interchangably herein by reference to reference numeral 115. The one or more items 115 may include objects, links, folders, documents, and the like. In the illustrative example of FIG. 1, two items are shown; however, any number of items may be present. In one example, the one or more items 115 may include a selectable talkgroup that allows connection of the mobile communication device 100 to a particular talkgroup. The selectable talkgroup may be included in a list of talkgroups on the mobile communication device 100. In another example, the one or more items 115 may provide a link to send commands to other mobile communication devices. For example, the link may provide the mobile communication device 100 with the functionality to send various commands, such as, for example, force regrouping of a talkgroup, disable another mobile communication device (e.g., disable two-way radio functionality), and the like. The one or more items 115 may also provide a selectable link to communicate to a particular mobile communication device. For example, the selectable link may, when selected, transmit a message or otherwise communicate with another mobile communication device. In yet another example, the one or more items 115 may provide permission to access a folder or files. For example, an item 115 displayed on the graphical user interface 105 may include an associated permission setting and may link the mobile communication device 100 to information located internally or to information stored externally (e.g., on a remote server).

The one or more items 115 may be displayed on the graphical user interface 105 according to whether each of the one or more items 115 is accessible based on the associated permission setting. For example, an accessible item may be displayed as a predetermined style, color, font, symbol, and the like. Similarly, an inaccessible item may be displayed according to a different predetermined style, color, font, symbol, and the like. Furthermore, an accessible item may permit various types of functions to be performed to that item, such as, for example viewing (e.g., read-only), writing (e.g., data entry or amendment), or erasing (e.g., deleting data) while an inaccessible item may provide limited (i.e., view-only) or no functionality on the mobile communication device 100. In some embodiments, the inaccessible item may not be visible on a particular mobile communication device as described below.

The mobile communication device 100 is associated with a specific user profile (e.g., the operator/owner of the mobile communication device 100). The user profile may be linked to the mobile communication device 100 through a predetermined relationship that is stored in the network infrastructure. For example, the mobile communication device 100 may be identified, at the network infrastructure, by a unique identification number. The unique identification number may be associated with the user profile or a specific group of individuals (e.g., a police officer). Alternatively, in some embodiments, the user profile is associated to the mobile communication device 100 by login information received on the mobile communication device 100 (e.g., manual entry of the unique identification number, manual entry of a username and password, etc.).

In some embodiments, one or more permission settings are associated with the user profile and, thereby, the user profile is used by the network infrastructure (and by the mobile communication device 100) to control network access to system resources including, for example, the accessibility of one or more items 115. For example, the permission settings associated with a user profile may dictate that a particular item 115 be made accessible on a mobile communication device 100 associated with the user profile (e.g., by a user log-in). Conversely, if the permission settings associated with the user profile may dictate that the particular item 115 be made inaccessible on a mobile communication device 100 associated with the user profile, the particular item 115 will be made inaccessible on the mobile communication device 100.

The one or more items 115 may switch from inaccessible to accessible and vice-versa via the methods described below. One or more inaccessible items may become accessible through validation of a user profile that has access to the one or more items 115 or, in some embodiments, that has specific authority to change permission settings associated with the one or more items 115. One method of validation of the user profile is through fingerprint entry on the graphical user interface 105 as described below.

Figure 2:
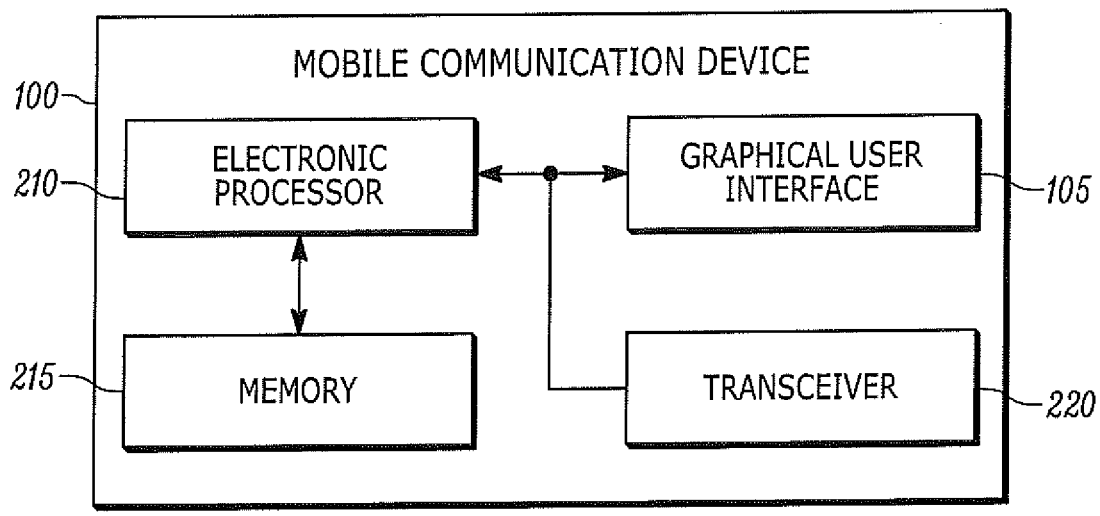
FIG. 2 is a block diagram of the mobile communication device of FIG. 1 in accordance with some embodiments.

As illustrated in FIG. 2, the mobile communication device 100 includes a plurality of electrical and electronic components that provide power, operation control, and protection to the components and modules within the mobile communication device 100. The mobile communication device 100 includes an electronic processor 205 (e.g., a programmable electronic microprocessor, microcontroller, or similar device), a memory 210 (e.g., non-transitory, machine-readable memory), a transceiver 220 (e.g., configured to send and receive data and communications), and the graphical user interface 105. The electronic processor 205 is communicatively coupled to the memory 210 and executes instructions stored on the memory 210. The electronic processor 205 is configured to retrieve from memory 210 and execute, among other things, instructions related to the control processes and method described herein. In other embodiments, the mobile communication device 100 includes additional, fewer, or different components.

Figure 3:
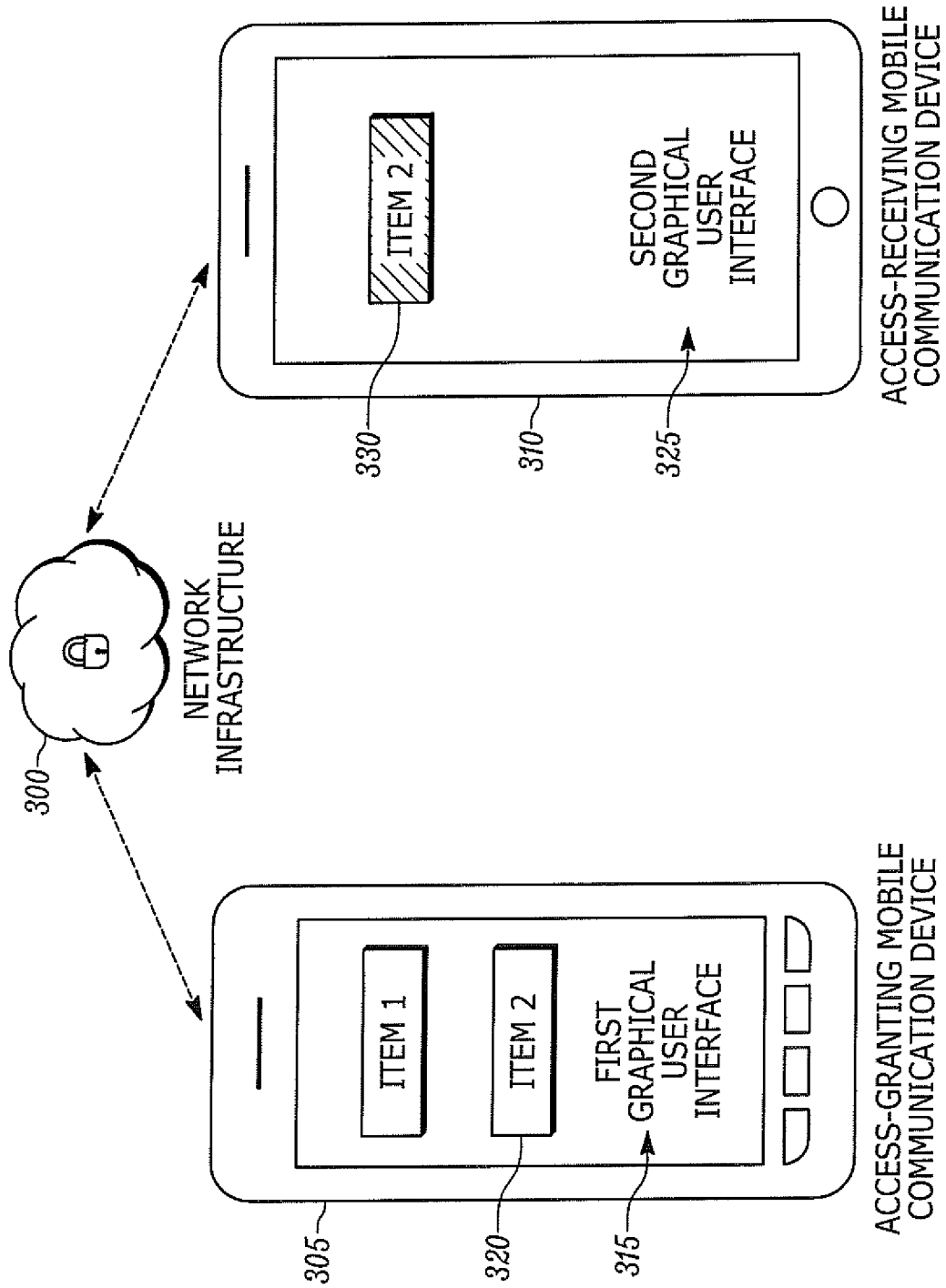
FIG. 3 is a functional block diagram of a wireless communication network including an access-granting mobile communication device and an access-receiving mobile communication device in accordance with some embodiments.

FIG. 3 illustrates a wireless communication network including a network infrastructure 300, an access-granting mobile communication device 305, and an access-receiving mobile communication device 310 according to one embodiment. The network infrastructure 300 may support two-way trunked radio and may include base stations, repeaters, site controllers, zone controllers, and the like. The network infrastructure 300 controls and coordinates radio and network traffic between mobile communication devices including controlling and managing talkgroup communication using dedicated control channels. The network infrastructure 300 may include network towers, antennas, network hubs, network servers and network control devices.

The access-granting mobile communication device 305 and the access-receiving mobile communication device 310 are each an embodiment of the mobile communication device 100 as described in reference to FIGS. 1 and 2. In this example, the access-granting mobile communication device 305 is associated with an unrestricted user profile with respect to a particular item ("Item 2"). As such, in this example, the permission settings associated with the unrestricted user profile provide access and granting privileges for the particular item ("Item 2"), but may be restricted in other ways or for other items. The access-granting mobile communication device 305 includes a first graphical user interface 315 and, because the access-granting mobile communication device 305 is associated with the unrestricted user profile, the first graphical user interface 315 displays the item ("Item 2") as an accessible item 320. As previously described, an accessible item 320 is one that is available for various types of functions including display on the access-granting mobile communication device 305.

In contrast, in this example, the access-receiving mobile communication device 310 is associated with a restricted user profile with respect to the particular item ("Item 2"). The permission settings associated with the restricted user profile does not provide full access to the particular item ("Item 2"). The access-receiving mobile communication device 310 also includes a second graphical user interface 325; however, because the access-receiving mobile communication device 310 is associated with the restricted user profile, the second graphical user interface 325 displays the item ("Item 2") as an inaccessible item 330. In some embodiments, the inaccessible item 330 is displayed as an icon or a symbol for illustration, but that does not allow access to the various types of functions described previously. In other embodiments, the inaccessible item 330 is displayed dimmed or greyed-out as compared to an accessible item 320 and may provide only limited viewing functionality. In still other embodiments (as discussed in further detail below), the inaccessible item 330 may not be displayed at all on the access-receiving mobile communication device 310 as long as the permission settings associated with the restricted user profile dictate that the user profile does not have access to the particular item ("Item 2").

In some embodiments, the wireless communication network includes an ad-hoc network (e.g., an incident area network). An ad-hoc network may be created when network modules (e.g., mobile communication devices), which can function independently of each other, come into range with each other and become connected. In such an example, the ad-hoc network does not utilize the network infrastructure 300 to communicate between mobile communication devices. For example, upon the occurrence of an event or emergency situation, multiple responders may arrive at the scene of the event. In such a situation, various government agencies, such as, for example, local police departments, Fire and Medical responders, and the like may respond to the event. However, these government agencies may use communication equipment that does not normally function together. The wireless communication network, by including an incident area network, provides interoperability between the communication equipment (e.g., by using mobile gateways in vehicles of the responders or through direct, peer-to-peer networking between compatible communication devices).

In some embodiments, the network infrastructure 300 provides access to network-based resources for the various responders that do not ordinarily have access to a particular resource. For example, the accessible item 320 on the access-granting mobile communication device 305 may link to a database or a program used solely by a police department (e.g., an internal network and computer system of the police department). Upon occurrence of the event, as described above, another responder, such as a police officer from a different jurisdiction, may require access to the accessible item 320 that links to the network of the police department. However, the accessible item 320 (i.e., "Item 2") on the access-granting mobile communication device 305 is an inaccessible item 330 on the access-receiving mobile communication device 310.

In some embodiments, the police officer (i.e., the user of the access-granting mobile communication device 305)) can grant the police officer from the different jurisdiction access to the item (i.e., "Item 2), by providing a fingerprint entry on the access-receiving mobile communication device 310. When the access-receiving mobile communication device 310 receives the fingerprint entry, it verifies that the fingerprint entry is associated with the unrestricted user profile (with respect to "Item 2"). The permission settings associated with the restricted user profile are updated to make "Item 2" an accessible item on the access-receiving mobile communication device 310 (either permanently or only as long as the access-receiving mobile communication device 310 remains connected to the incident area network).

Figure 4:
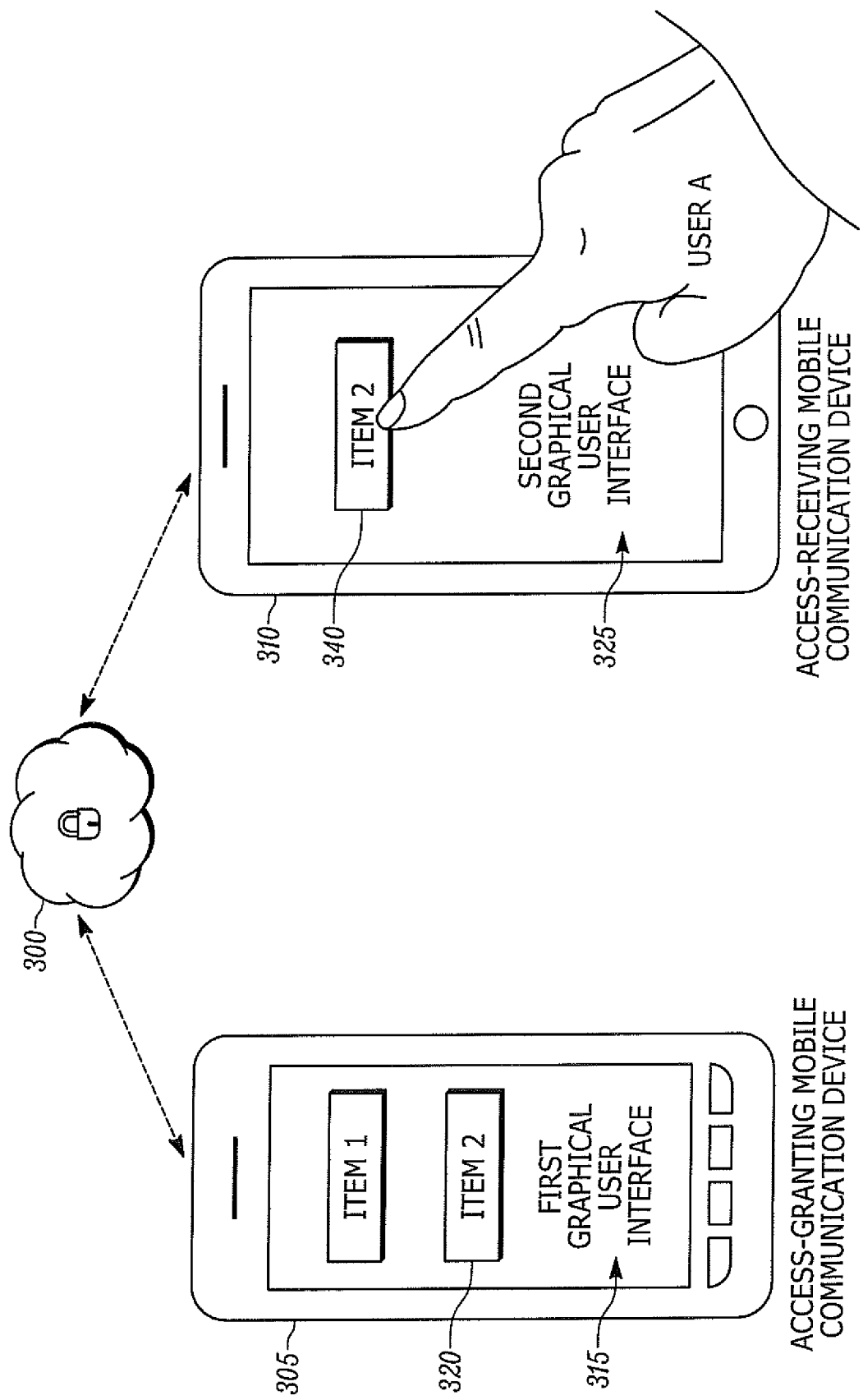
FIG. 4 is a functional block diagram illustrating modification of permissions associated with network-based resources for an access-receiving mobile communication device via the wireless communication network of FIG. 3 in accordance with some embodiments.

FIG. 4 illustrates one implementation of the example described above where a permission setting for a particular item ("Item 2") is changed in response to a fingerprint entry. Similar to FIG. 3, both the access-granting mobile communication device 305 and the access-receiving mobile communication device 310 are communicatively linked to the network infrastructure 300. In this example, the access-receiving mobile communication device 310 receives a fingerprint entry, identifies the user profile associated with the fingerprint entry via the network infrastructure 300, and, after determining an access level associated with the user profile corresponding to the fingerprint entry (i.e., an "unrestricted user profile"), the access-receiving mobile communication device 310 changes the inaccessible item 330 to an accessible item 340 on the second graphical user interface 325. Once the item is displayed as an accessible item 340, the access-receiving mobile communication device 310 provides at least partial access to the accessible item, such as, for example, read privileges. In some embodiments, the access-receiving mobile communication device 310, once changing access to the item, allows unrestricted access or at least the same access to the item as the permission settings associated with the unrestricted user profile.

In the example of FIG. 4, both the access-granting mobile communication device 305 and the access-receiving mobile communication device 310 are connected to the same network infrastructure 300. Being connected to the network infrastructure 300 may include obtaining prior authentication, registration, and the like (e.g., a user log-in) for the access-granting mobile communication device 305 and the access-receiving mobile communication device 310. As a consequence, the access-receiving mobile communication device 310 may identify the user profile associated with the fingerprint entry by communicating with the network infrastructure 300 (e.g., by communicating over a wide area network with either a remote server and a remote database) or by communicating directly via the ad-hoc network. When the access-receiving mobile communication device 310 communicates with the network infrastructure 300, the network infrastructure 300 acts as an authorization entity. The authorization entity validates the fingerprint entry and grants access for the access-receiving mobile communication device 310 as further described in reference to FIGS. 6A and 6B.

Figure 5:
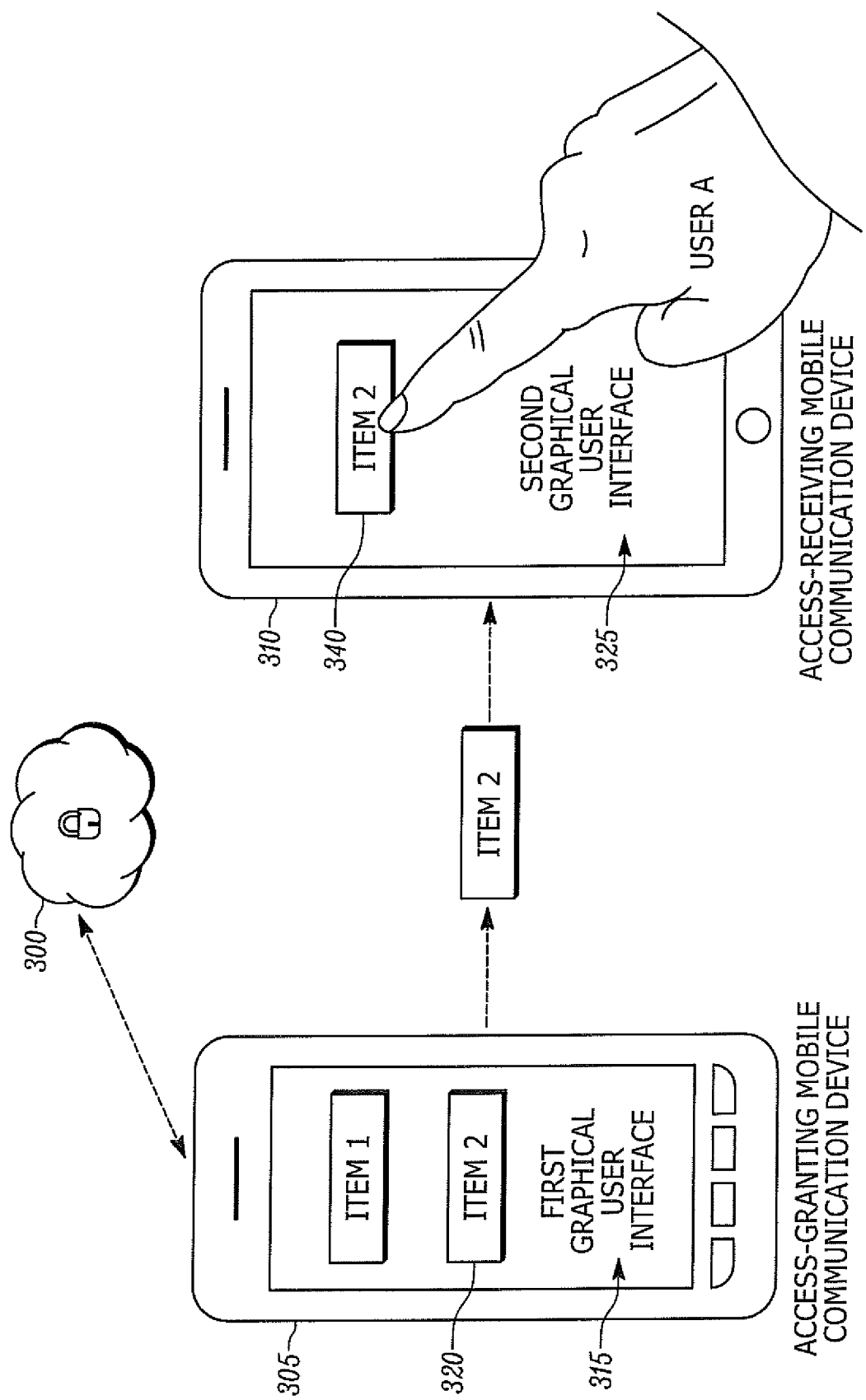
FIG. 5 is a functional block diagram illustrating modification of permissions associated with network-based resources for an access-receiving mobile communication device via direct communication with an access-granting mobile communication device in accordance with some embodiments.

However, in some embodiments, the permission settings associated with a received fingerprint entry are verified through a direct connection (e.g., using short range communication, such as, a local area network, Bluetooth®, or a wired connection) between the access-granting mobile communication device 305 and the access-receiving mobile communication device 310. In such case, the access-granting mobile communication device 305 acts as the authorization entity. For example, in FIG. 5, the access-granting mobile communication device 305 is communicatively coupled to the network infrastructure 300 and the access-receiving mobile communication device 310 may not yet be communicatively coupled to the network infrastructure 300. When the fingerprint entry is received on the access-receiving mobile communication device 310, the access-receiving mobile communication device 310 communicates directly with the access-granting mobile communication device 305 to confirm that the received fingerprint entry is associated with the unrestricted user profile of the access-granting mobile communication device 305. Once the fingerprint entry is validated through the direct connection, the item ("Item 2") becomes an accessible item 340.

In some embodiments, the accessible item 340 allows the access-receiving mobile communication device 310 to interact with the access-granting mobile communication device 305 and, through the access-granting mobile communication device 305, to interact with resources via the network infrastructure 300. In other embodiments, validation of the fingerprint entry and the accessibility of "Item 2" adds the access-receiving mobile communication device 310 to the wireless communication network so that it can communicate and access resources via the network infrastructure 300 directly. Furthermore, in some embodiments, the access-receiving mobile communication device 310 is not a member of any network until it is added to the wireless communication network by the fingerprint entry associated with an unrestricted user profile.

Figure 6A:
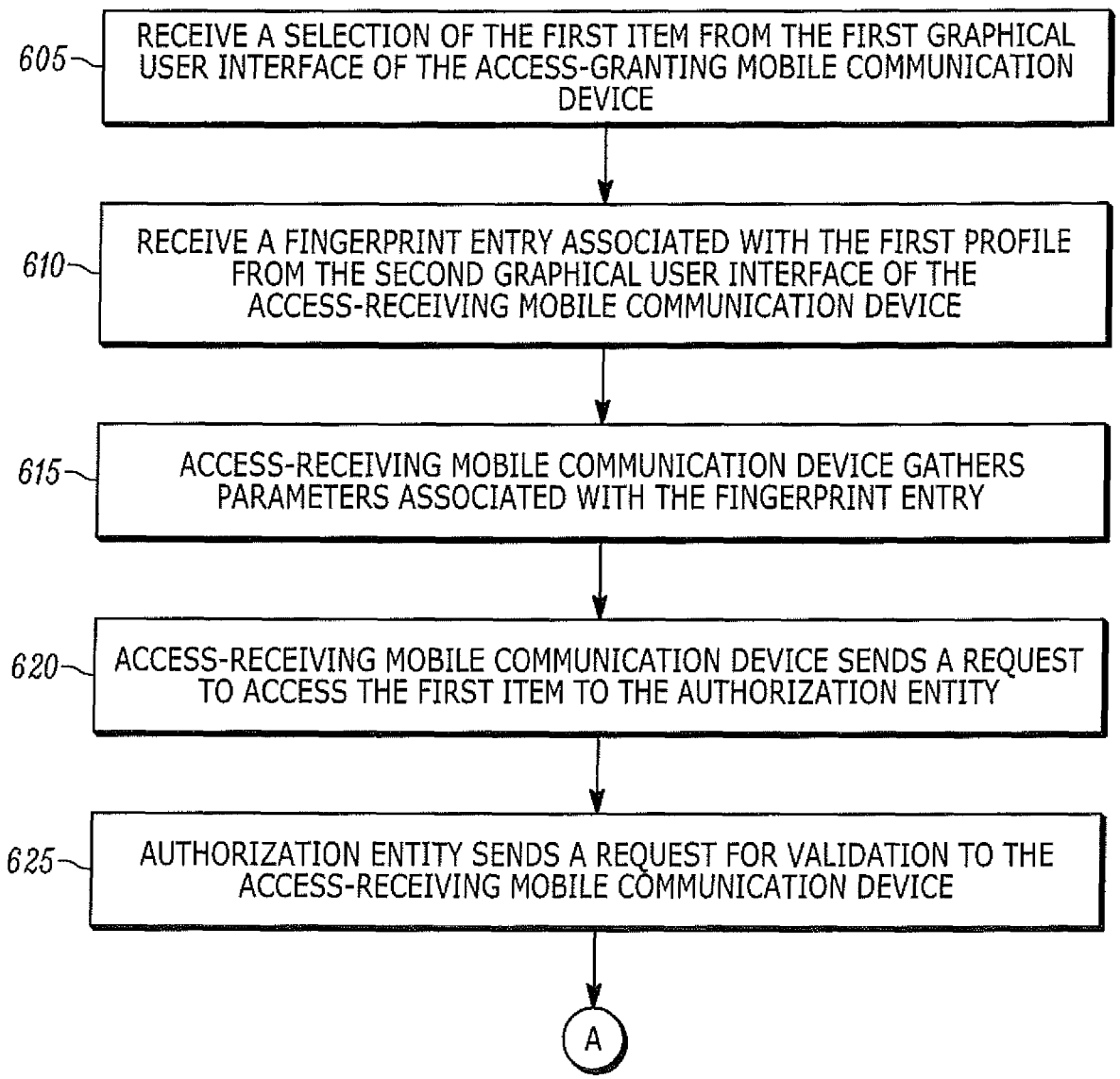
FIGS. 6A and 6B are a flowchart of a method of modifying permissions associated with one or more network-based resources for the access-receiving mobile communication device of FIG. 3 in accordance with some embodiments.
Figure 6B:
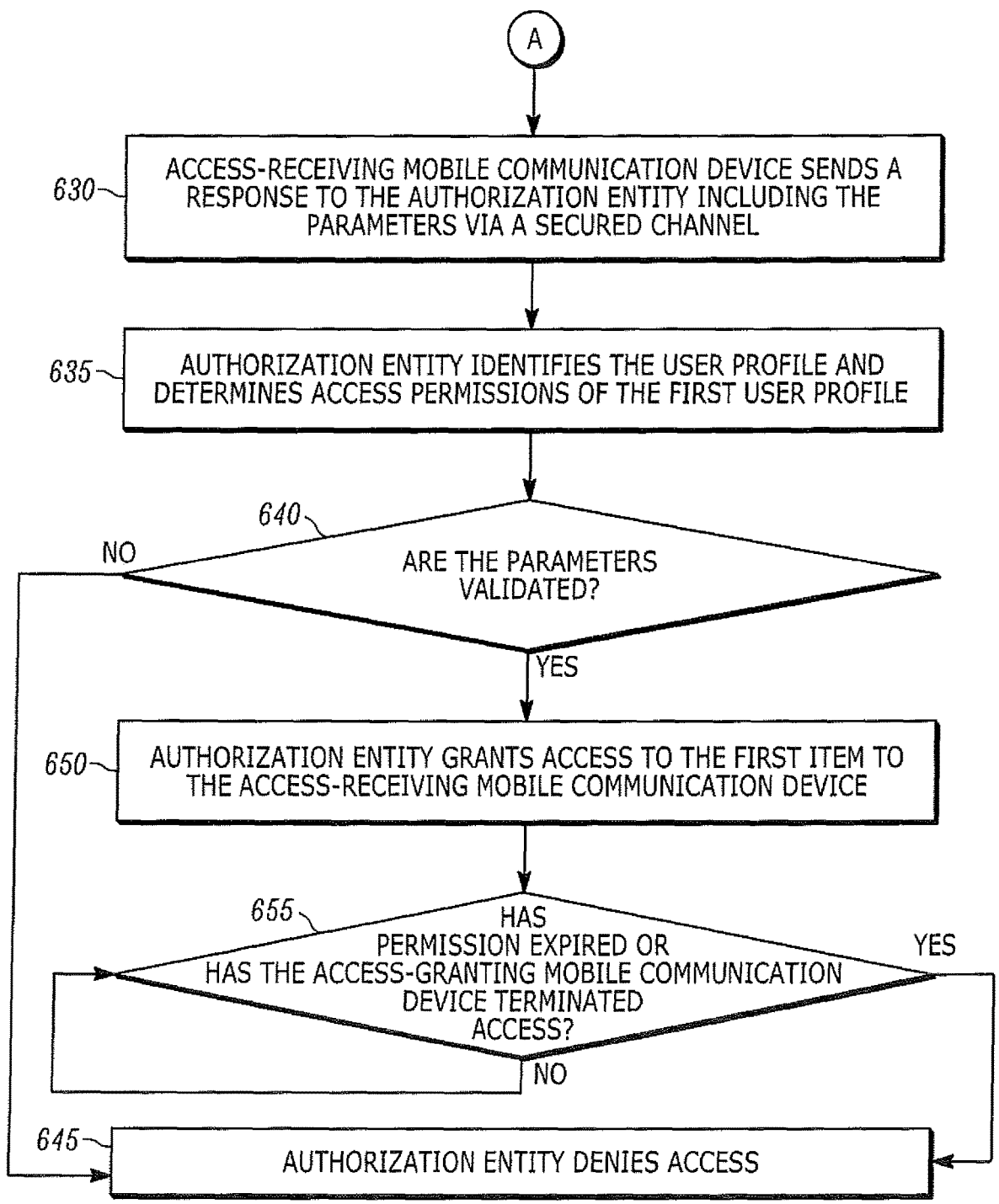

Illustrated in FIGS. 6A and 6B is a method of adjusting permission settings associated with one or more network-based resources (e.g., network-based resources provided via the one or more items 115) on the access-receiving mobile communication device 310 in accordance with some embodiments. The access-granting mobile communication device 305 receives a selection of a first item of the one or more items 115 from the first graphical user interface 315 or other input buttons (block 605). The first item is selected as one of the one or more items 115 that is to be shared with the access-receiving mobile communication device 310. The access-receiving mobile communication device 310 then receives a fingerprint entry associated with the unrestricted user profile from the second graphical user interface 325 (block 610). The access-receiving mobile communication device 310 gathers parameters associated with the fingerprint entry (block 615). The parameters may include, for example, the fingerprint entry itself, a time of receipt of the fingerprint entry, a location of the access-receiving mobile communication device 310 (e.g., global positioning system (GPS) coordinates) at the time of receipt of the fingerprint entry, a device identification of the access-receiving mobile communication device 310, an identification of the selected item, and the like. Some of the parameters provide a way to perform secondary confirmation of the fingerprint entry for more secure access as compared to fingerprint entry alone.

The access-receiving mobile communication device 310 sends a request for access to an authorization entity (block 620) in response to receiving the fingerprint entry and, in some embodiments, in response to receiving a selection of the inaccessible item 330 displayed on the second graphical user interface 325. However, in some embodiments, the inaccessible item 330 is not displayed on the second graphical user interface 325 and, as such, the access-receiving mobile communication device 310 sends a request for access without yet having knowledge of what item is to become shared/accessible. In the latter case, the item to become shared/accessible is identified by the selection of the item on the access-granting mobile communication device 305. The authorization entity communicates with the access-granting mobile communication device 305 to determine what item is selected on the access-granting mobile communication device 305.

Next, the authorization entity sends a request for validation to the access-receiving mobile communication device 310 (block 625). As continued in FIG. 6B, in response to receiving a request for validation, the access-receiving mobile communication device 310 sends a response to the authorization entity including the parameters via a secured channel (e.g., an encrypted message) (block 630). The authorization entity identifies a user profile associated with the received fingerprint entry (e.g., the unrestricted user profile) and determines access permissions associated with the identified user profile for the specific item (block 635). The authorization entity may identify the user profile by comparing the fingerprint entry received from the access-receiving mobile communication device 310 with known fingerprints stored in memory or a database. When a match is found, the authorization entity determines the access permissions associated with the user profile.

The authorization entity determines when the parameters received from the access-receiving mobile communication device 310 are validated (block 640). For example, the time of receipt of the fingerprint entry from the access-receiving mobile communication device 310 (FIG. 6A, block 615) may be compared with the time that the first item was selected on the access-granting mobile communication device 305 (FIG. 6A, block 610) to confirm temporal proximity of the two actions. Similarly, spatial proximity of the access-receiving mobile communication device 310 to the access-granting mobile communication device 305 can be confirmed by comparing GPS coordinates from the access-receiving mobile communication device 310 and the access-granting mobile communication device 305.

When the parameters cannot be validated (e.g., the permission settings associated with a user profile corresponding to the fingerprint entry do not allow granting access to others, a user profile corresponding to the fingerprint entry cannot be identified, or the parameter data for the access-granting mobile communication device 305 and the access-receiving mobile communication device 310 do not match), the authorization entity will deny access (block 645) and the item remains inaccessible on the access-receiving mobile communication device 310. Conversely, when the access permissions are validated, the authorization entity makes the first item accessible on the access-receiving mobile communication device 310 (block 650).

In some embodiments, the access granted by this method remains permanently associated with the user profile of the access-receiving mobile communication device 310. However, in other embodiments and situations, the access permissions granted by this process will expire after a predetermined period of time or on termination by the access-granting mobile communication device 305 (block 655). Similarly, in some embodiments, when the access-receiving mobile communication device 310 is part of an incident area network, the access permissions granted by this process will terminate when the access-receiving mobile communication device 310 is disconnected from the incident area network. Permission may also expire when the wireless communication network is terminated or when either or both of the access-granting mobile communication device 305 and the access-receiving mobile communication device 310 have exited a range of the wireless communication network. When the access permissions are terminated, the access-receiving mobile communication device 310 will be denied further access to the first item (block 670).

Although the example of FIGS. 6A and 6B describe a selection of an item on the access-granting mobile communication device 305, in some embodiments, such a selection is not required (e.g., block 605) prior to the access-receiving mobile communication device 310 receiving the fingerprint entry (e.g., block 610). Rather, the first item may already be visible on the access-receiving communication device 310 as an inaccessible item 330, as described above. Instead of receiving a selection of the first item from the access-granting mobile communication device 305, the first item is selected on the second graphical user interface 325 of the access-receiving mobile communication device 310. In this case, the fingerprint entry is received directly on the inaccessible item 330. Once the fingerprint entry is received, the access-receiving mobile communication device 310 proceeds with the method (e.g., at block 620).

Figure 7:
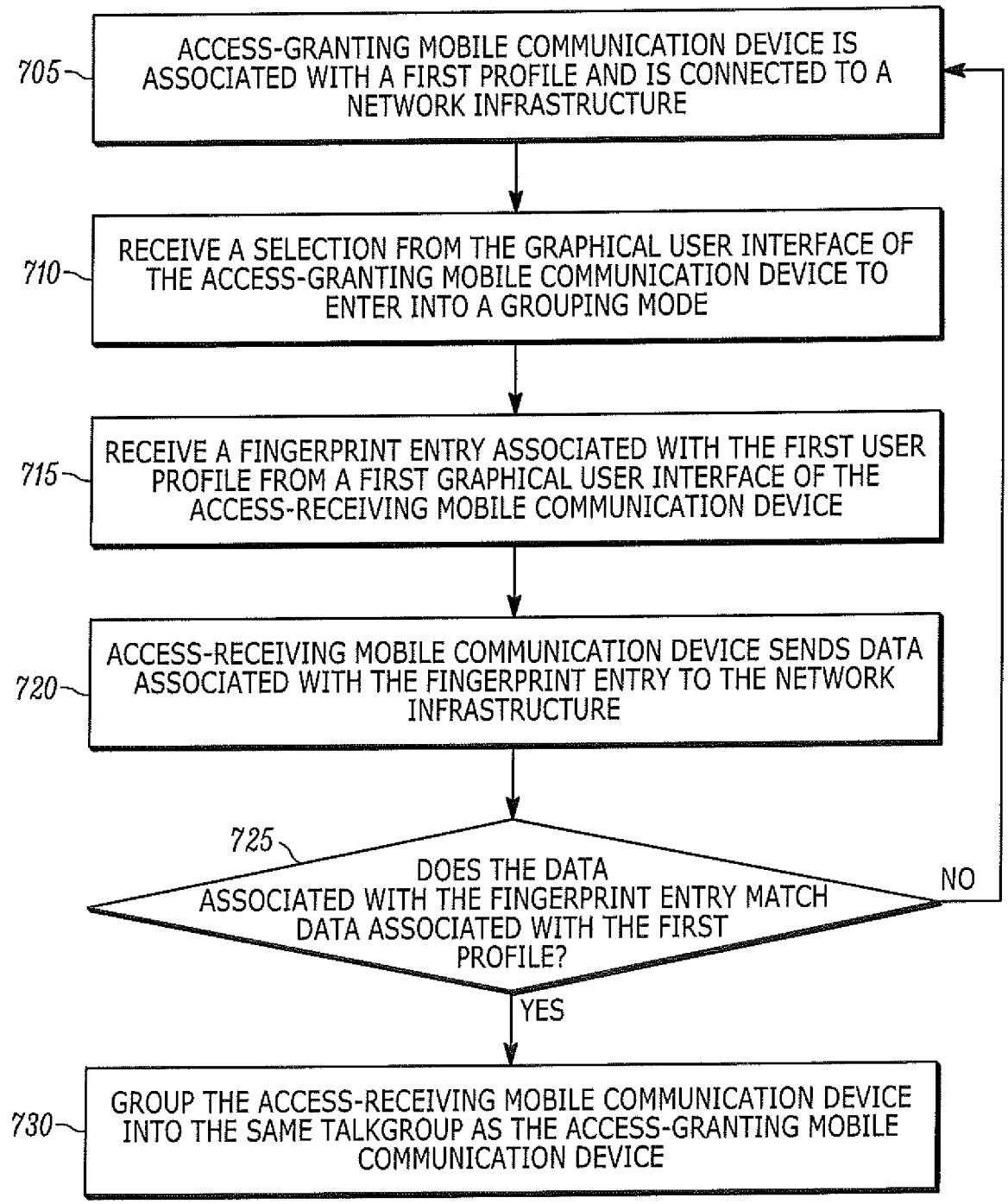
FIG. 7 is a flowchart of a method of grouping a plurality of mobile communication devices using the access-granting mobile communication device of FIG. 3.

Furthermore, although some of the examples above describe using a fingerprint entry from an authorized user to grant access to specific objects or data, in some embodiments, the fingerprint entry mechanism described above is used to group a plurality of mobile communication devices into an ad-hoc network or to create a talkgroup. FIG. 7 illustrates an example of one such method. As described above, the access-granting mobile communication device 305 is associated with an unrestricted user profile and is connected to the network infrastructure 300 (block 705). The access-granting mobile communication device 305 receives a selection from the first graphical user interface 315 to enter into a grouping mode (block 710). In the grouping mode, the access-granting mobile communication device 305 is configured to enter into a talkgroup with other mobile communication devices. The access-receiving mobile communication device 310 receives a fingerprint entry associated with the unrestricted user profile from the second graphical user interface 325 (block 715). The access-receiving mobile communication device 310 sends parameters associated with the fingerprint entry and with the access-receiving mobile communication device 310 to the network infrastructure 300 (block 720). The network infrastructure 300 determines if the parameters associated with the fingerprint entry match data associated with the unrestricted user profile (block 725). When the parameters associated with the fingerprint entry match the data associated with the unrestricted user profile, the network infrastructure 300 joins the access-receiving mobile communication device 310 into the same talkgroup as the access-granting mobile communication device 305 (block 730). If the access-granting mobile communication device 305 is not currently in a talkgroup, a new talkgroup may be created including the access-granting mobile communication device 305 and the access-receiving mobile communication device 310.

In some embodiments, a mobile communication device 100 can simultaneously be approved to interact with multiple talkgroups. In such embodiments, if the access-granting mobile communication device 305 is currently associated with multiple talkgroups, the graphical user interface of either the access-granting mobile communication device 305 or the access-receiving mobile communication device 310 may display a prompt requesting a selection of a talkgroup that will be joined by the access-receiving mobile communication device 310. Similarly, in some embodiments, if the access-granting mobile communication device 305 is currently associated with one or more talkgroups, the prompt may present a selection of whether the access-receiving mobile communication device 310 is to be added to an existing talkgroup with the access-granting mobile communication device 305 or a new talkgroup is to be created. For example, the first graphical user interface 315 of the access-granting mobile communication device 305 may prompt the user to select an existing talkgroup or a new talkgroup when the access-granting mobile communication device 305 enters the "grouping mode."

The method of grouping described above made be repeated for a third, a fourth, and more mobile communication devices. In such a case, the access-granting mobile communication device 305 may receive a single selection to enter the grouping mode prior to commencing with a fingerprint entry on each of the mobile communication devices to be connected. As a consequence, the access-granting mobile communication device 305 may quickly set up a talkgroup with other mobile communication devices by using a single input for each grouped mobile communication device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of modifying permission settings that control access to one or more network-based resources on a first communication device, the method comprising:
    operating the first communication device using permission settings associated with a first user profile;
    receiving a fingerprint entry on the first communication device;
    sending a secondary confirmation including parameters associated with receiving the fingerprint entry on the first communication device, the parameters including at least a time of receipt of the fingerprint entry;
    identifying the fingerprint entry as associated with a second user profile, wherein the second user profile includes authorization to modify the permission settings for the one or more network-based resources; and
    modifying the permission settings for the one or more network-based resources when the fingerprint entry is identified as associated with the second user profile and when the secondary confirmation is confirmed, wherein the secondary confirmation is confirmed based on a temporal proximity between the time of receipt of the fingerprint entry and a selection of an inaccessible item.

2. The method of claim 1, wherein operating the first communication device further comprises:
    displaying a first graphical user interface on the first communication device, wherein the first graphical user interface is associated with the first user profile, including displaying an inaccessible item on the first graphical user interface before receiving the fingerprint entry, the inaccessible item linking to one of the one or more network-based resources.

3. The method of claim 2, wherein displaying the first graphical user interface on the first communication device includes displaying the inaccessible item in a different style than an accessible item, and wherein receiving a fingerprint entry on the first communication device includes receiving the fingerprint entry directly on the inaccessible item.

4. The method of claim 1, the method further comprising:
    receiving a selection of an item on a second graphical user interface of a second communication device associated with the second user profile prior to receiving the fingerprint entry on the first communication device, the item linking to one of the one or more network-based resources; and
    after receiving the selection of the item and after identifying the fingerprint entry as associated with the second user profile, making the item available for access on the first communication device.

5. The method of claim 1, wherein modifying the permission settings for the one or more network based resources includes authorizing the first communication device to access the one or more network-based resources via a wide area network that is communicatively coupled to the first communication device.

6. The method of claim 1, wherein modifying the permission settings for the one or more network based resources includes authorizing the first communication device to access the one or more network-based resources via a second communication device using direct communication between the first communication device and the second communication device.

7. A communication system for providing access to one or more network-based resources based on permission settings, the communication system comprising:
    a first communication device configured to
        display a first graphical user interface associated with a first user profile;
        receive a fingerprint entry on the first communication device;
        send a secondary confirmation including parameters associated with receiving the fingerprint entry on the first communication device, the parameters including at least a time of receipt of the fingerprint entry;
        identify the fingerprint entry as associated with a second user profile, wherein the second user profile includes authorization to modify the permission settings for the one or more network-based resources; and
        modify the permission settings of the first communication device for the one or more network-based resources when the fingerprint entry is identified as associated with the second user profile, and the secondary confirmation is confirmed based on a temporal proximity between the time of receipt of the fingerprint entry and a selection of an inaccessible item;
    wherein the first graphical user interface displays an inaccessible item before receiving the fingerprint entry, the inaccessible item linking to one of the one or more network-based resources.

8. The communication system of claim 7, wherein the first communication device is configured to join to a talkgroup of a second communication device associated with the second user profile.

9. The communication system of claim 7, wherein the first communication device is configured to display the inaccessible item in a different style than an accessible item, and to receive the fingerprint entry directly on the inaccessible item.

10. The communication system of claim 7, the communication system comprising:
    a second communication device configured to
        receive a selection of an item on a second graphical user interface associated with the second user profile prior to receiving the fingerprint entry on the first communication device, the item linking to one of the one or more network-based resources; and
        after receiving the selection of the item, communicate the selection of the item to an authorization entity.

11. The communication system of claim 7, wherein the first communication device is configured to receive an authorization to access the one or more network-based resources via a wide area network that is communicatively coupled to the first communication device.

12. The communication system of claim 7, wherein the first communication device is configured to receive an authorization to access the one or more network-based resources via a second communication device using direct communication between the first communication device and the second communication device.

13. The communication system of claim 7, wherein the secondary confirmation includes parameters including at least a location of the first communication device.

14. A communication system including a wireless communication network that provides access to one or more network-based resources based on permission settings, the communication system comprising:
    a first communication device including a touchscreen, the first communication device associated with a first user profile;
    a second communication device including a touchscreen, the second communication device associated with a second user profile;
    the wireless communication network communicatively coupled to the first communication device and the second communication device, the wireless communication network configured to
        receive a selection of an item on a second graphical user interface of the second communication device, the item linking to one of the one or more network-based resources,
        receive a fingerprint entry via the touchscreen of the first communication device,
        receive a secondary confirmation including parameters associated with receiving the fingerprint entry on the first communication device, the parameters including at least a time of receipt of the fingerprint entry,
        identify the fingerprint entry as associated with the second user profile, wherein the second user profile includes authorization to modify the permission settings for the one or more network-based resources, and
        after receiving the selection of the item and after identifying the fingerprint entry as associated with the second user profile, modify the permission settings for the one or more network-based resources by making the item available for access on the first communication device and when the secondary confirmation is confirmed, wherein the secondary confirmation is confirmed based on a temporal proximity between the time of receipt of the fingerprint entry and a selection of an inaccessible item.

15. The communication system of claim 14, wherein the wireless communication network is configured to join the first communication device to a talkgroup of the second communication device.

16. The communication system of claim 14, wherein the wireless communication network is a wide area network.

17. The communication system of claim 14, wherein the wireless communication network is an incident area network.

18. The communication system of claim 7, wherein the first communication device is configured to modify the permission settings of the first communication device for the one or more network-based resources by making the inaccessible item available for access on the first communication device.

19. A method of modifying permission settings that control access to one or more network-based resources on a first communication device, the method comprising:
    operating the first communication device using permission settings associated with a first user profile;
    receiving a fingerprint entry on the first communication device;

sending a secondary confirmation including parameters associated with receiving the fingerprint entry on the first communication device, wherein the parameters include a location of the first communication device at a time of receipt of the fingerprint entry;
identifying the fingerprint entry as associated with a second user profile, wherein the second user profile includes authorization to modify the permission settings for the one or more network-based resources; and
modifying the permission settings for the one or more network-based resources when the fingerprint entry is identified as associated with the second user profile and when the secondary confirmation is confirmed;
wherein the secondary confirmation is confirmed based on a spatial proximity between the location of the first communication device and a location of the second communication device at the time of receipt of the fingerprint entry.

\* \* \* \* \*